(12) United States Patent
Wimmer et al.

(10) Patent No.: US 7,343,742 B2
(45) Date of Patent: Mar. 18, 2008

(54) EXHAUST TURBOCHARGER

(75) Inventors: Rudolf Wimmer, Haidershofen (AT); Leopold Eistershofen, Steinbach/Steyr (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/209,859

(22) Filed: Aug. 24, 2005

(65) Prior Publication Data

US 2006/0042245 A1 Mar. 2, 2006

(30) Foreign Application Priority Data

Aug. 24, 2004 (DE) ...................... 10 2004 040 893

(51) Int. Cl.
*F02B 33/44* (2006.01)
*F02M 25/07* (2006.01)
*F02M 25/06* (2006.01)
*F01D 1/02* (2006.01)
*F01D 9/00* (2006.01)

(52) U.S. Cl. ............... 60/605.2; 60/605.1; 123/568.29; 415/205

(58) Field of Classification Search ............. 60/605.1, 60/605.2; 415/144–145, 151, 205, 204, 203, 415/184, 58.3, 58.4; 123/568.29; *F02M 25/07, F02M 25/06; F04D 29/44*

See application file for complete search history.

(56) References Cited

U.S. PATENT DOCUMENTS

| | | | | |
|---|---|---|---|---|
| 3,042,291 A | * | 7/1962 | Greenwald | 415/26 |
| 4,250,711 A | * | 2/1981 | Zehnder | 60/605.2 |
| 4,461,150 A | * | 7/1984 | Grohn | 60/605.2 |
| 5,255,514 A | * | 10/1993 | Wentworth, Jr. | 60/605.1 |
| 5,327,725 A | * | 7/1994 | Mitsubori | 60/605.2 |
| 6,123,061 A | * | 9/2000 | Baker et al. | 123/573 |
| 6,810,867 B2 | * | 11/2004 | Schmid et al. | 123/568.17 |
| 6,988,365 B2 | * | 1/2006 | Sasaki | 60/605.2 |
| 7,021,058 B2 | * | 4/2006 | Scheinert | 60/605.1 |
| 7,043,914 B2 | * | 5/2006 | Ishikawa | 60/605.2 |
| 7,117,843 B2 | * | 10/2006 | Liu et al. | 60/605.2 |
| 7,127,893 B2 | * | 10/2006 | Schmid et al. | 60/605.2 |
| 7,131,271 B2 | * | 11/2006 | Bulicz et al. | 60/605.2 |
| 2004/0221831 A1 | * | 11/2004 | Chmela et al. | 123/301 |

(Continued)

FOREIGN PATENT DOCUMENTS

| | | | |
|---|---|---|---|
| DE | 4213047 A1 | * | 10/1993 |
| DE | 103 48 366 A1 | | 5/2004 |
| EP | 1 273 775 A1 | | 1/2003 |
| JP | 57159950 A | * | 10/1982 |
| JP | 11006500 A | * | 1/1999 |
| JP | 2005351193 A | * | 12/2005 |
| WO | WO 2004031564 A1 | * | 4/2004 |

OTHER PUBLICATIONS

German Search Report No. 10 2004 040 893.9, dated May 4, 2005.

*Primary Examiner*—Thai-Ba Trieu
(74) *Attorney, Agent, or Firm*—Crowell & Moring LLP

(57) ABSTRACT

An exhaust turbocharger with a housing, a compressor arranged in a compressor space and an exhaust turbine is arranged in a turbine space, whereby an exhaust line from the turbine outlet is connected to a low-pressure side of the compressor space via an exhaust recirculation line which extends through the housing and is designed largely in a spiral form in the housing. The recirculated exhaust gas flow arrangements improve the dynamics by providing higher turbocharger rotational speeds in the partial load range due to the production of a pre-twist by the exhaust recirculation stream.

6 Claims, 4 Drawing Sheets

U.S. PATENT DOCUMENTS

| | | | |
|---|---|---|---|
| 2005/0103013 A1* | 5/2005 | Brookshire et al. | 60/605.2 |
| 2005/0172613 A1* | 8/2005 | Blomquist | 60/605.2 |
| 2005/0254941 A1* | 11/2005 | Inoue et al. | 415/182.1 |
| 2006/0054148 A1* | 3/2006 | Aberle | 60/605.2 |
| 2006/0137665 A1* | 6/2006 | Khair et al. | 60/605.2 |
| 2006/0156723 A1* | 7/2006 | Tonetti et al. | 60/605.2 |

* cited by examiner

EXHAUST TURBOCHARGER

This application claims the priority of German application no. 102004040893.9, filed Aug. 24, 2004, the disclosure of which is expressly incorporated by reference herein.

BACKGROUND AND SUMMARY OF THE INVENTION

This invention relates to an exhaust turbocharger with exhaust recirculation.

Unexamined German Patent DE 103 48 366 A1 describes a method for operating a diesel engine with direct fuel injection, having an intake tract, an outlet tract and an exhaust turbocharger. The internal combustion engine is supercharged by an exhaust turbocharger which has a turbine that is operated with exhaust and a compressor driven by the turbine. Upstream from the compressor, a charging air cooler is arranged on the intake side. In addition a high-pressure exhaust recirculation system with an exhaust recirculation line is provided between the exhaust line and the intake tract. The high-pressure exhaust recirculation system has an exhaust recirculation cooler and an exhaust-recirculation valve. Depending on the pressure difference between the exhaust line and the intake tract, an exhaust pump may also be provided in the exhaust recirculation line to control and/or increase the exhaust recirculation rate. In addition to the high-pressure exhaust recirculation system, a low-pressure exhaust recirculation system is also provided upstream from the turbine and downstream from the compressor. Downstream from a particle filter in the exhaust line, a second exhaust recirculation line branches off and opens downstream from the compressor into the intake tract. An exhaust recirculation cooler and an exhaust recirculation valve are provided in the second exhaust recirculation line. To control the exhaust recirculation rate, an exhaust valve is provided in the exhaust line downstream from the branching point.

With the embodiment described here, a method for operating an internal combustion engine can be implemented. With this method, minimal nitrogen oxide emissions and soot emissions occur from the lower partial load range to the full load range and a high efficiency is achieved.

The object of the present invention is to further increase the efficiency of the exhaust turbocharger.

This object is achieved by incorporation of an exhaust recirculation line largely in a spiral form in the exhaust turbocharger housing.

The invention improves the dynamics by providing higher turbocharger speeds in the partial load range because of creation of pre-twist due to the exhaust recirculation stream. In addition, the overall efficiency of the exhaust turbocharger in the partial load range is improved at high exhaust recirculation rates. Furthermore the invention constitutes a compact implementation of exhaust recirculation into the clean air stream by integration into the compressor housing.

Due to this compact introduction of the exhaust into the compressor housing, the precipitation of condensate from the hot combustion gas under unfavorable temperature conditions is minimized. The short dwell time of the exhaust in the compressor housing allows the formation of only small droplets, which do not cause any damage to the compressor wheel. Due to the spiral channel in the compressor housing, possible quantities of condensate are kept at the lowest point in the compressor housing due to the aerodynamic backpressure of the main air stream and can evaporate again after "hot" operating conditions.

Tangential introduction of the exhaust into the compressor space enhances the advantages mentioned above.

Alternatively, the direction of discharge of the exhaust return line into the compressor space may also include an axial component. In this case the point of introduction into the main stream advantageously leads into an especially large volume. In this way the main stream is only minimally constricted and thus a reduced intake vacuum is achieved.

A flow guidance element also may be provided, further increasing the spiral twist.

Other objects, advantages and novel features of the present invention will become apparent from the following detailed description of the invention when considered in conjunction with the accompanying drawings.

BRIEF DESCRIPTION OF THE DRAWINGS

FIG. 3b shows a longitudinal section through a compressor space of the exhaust gas turbocharger shown in FIG. 3a.

DETAILED DESCRIPTION

Figure 1:
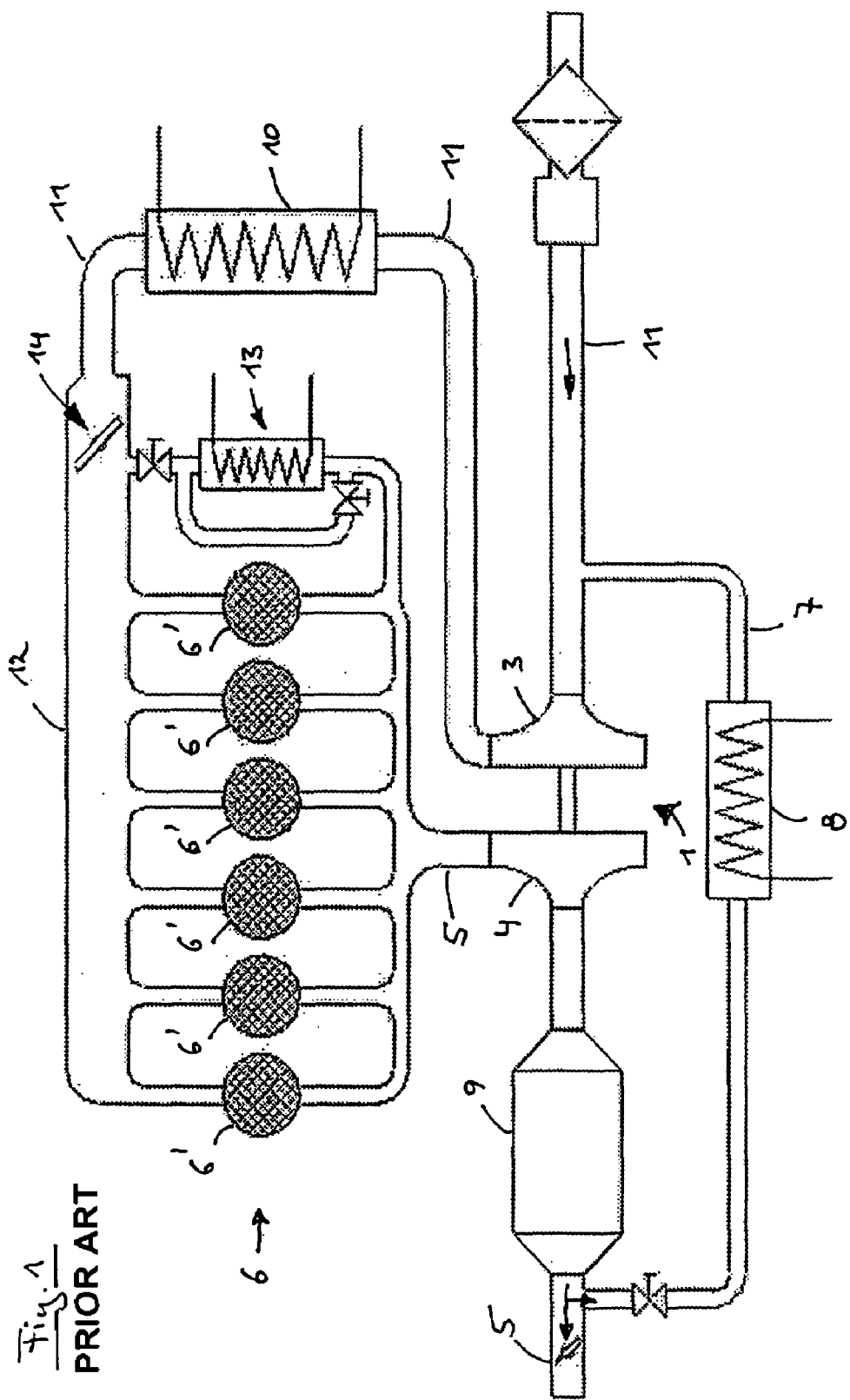
FIG. 1 shows schematically how an exhaust turbocharger is tied into an intake tract and an exhaust line of an internal combustion engine according to the state of the art cited.

FIG. 1 shows schematically an internal combustion engine 6 with its 6 cylinders 6' and an exhaust line 5 and an intake tract 11. The intake tract 11 and the exhaust line 5 are connected to one another by an exhaust turbocharger 1. The intake air flows into the intake tract 11, indicated by arrows, and then into a compressor space 3' in which a compressor 3 of the exhaust turbocharger 1 is situated. In addition, the intake are flows through the intake tract 11 into a second heat exchanger 10, an intake air cooler, and then into a collector 12 from which the intake airstream is divided among the individual cylinders 6'.

The exhaust that is burned is then conveyed into the exhaust line 5 in which the exhaust first passes through an exhaust bend and goes from there further into a turbine space (not shown) in which a turbine 4 of the exhaust turbocharger 1 is situated. Downstream from the turbine space, the exhaust is conveyed through a catalytic converter 9 and then divided into two partial exhaust streams. The first partial exhaust stream leaves the exhaust line 5 as exhaust into the ambient air, and the second partial exhaust stream is recirculated in the direction of flow upstream from the compressor 3 back to the intake tract 11, passing through a low-pressure exhaust recirculation line 7 which contains a first heat exchanger 8, a low-pressure exhaust recirculation cooler. The division of the exhaust into the two exhaust substreams may be regulated by a valve.

In addition to the low-pressure exhaust recirculation, the internal combustion engine 6 which is indicated schematically also has a second, a so-called high-pressure, exhaust recirculation line 13 which branches off from the exhaust bend and recycles exhaust from before the collector 12 into the intake tract 11. The quantity of exhaust recycled in the high-pressure exhaust recirculation line 13 is regulated by a quantity adjusting element 14 in the intake tract 11.

Figure 2:
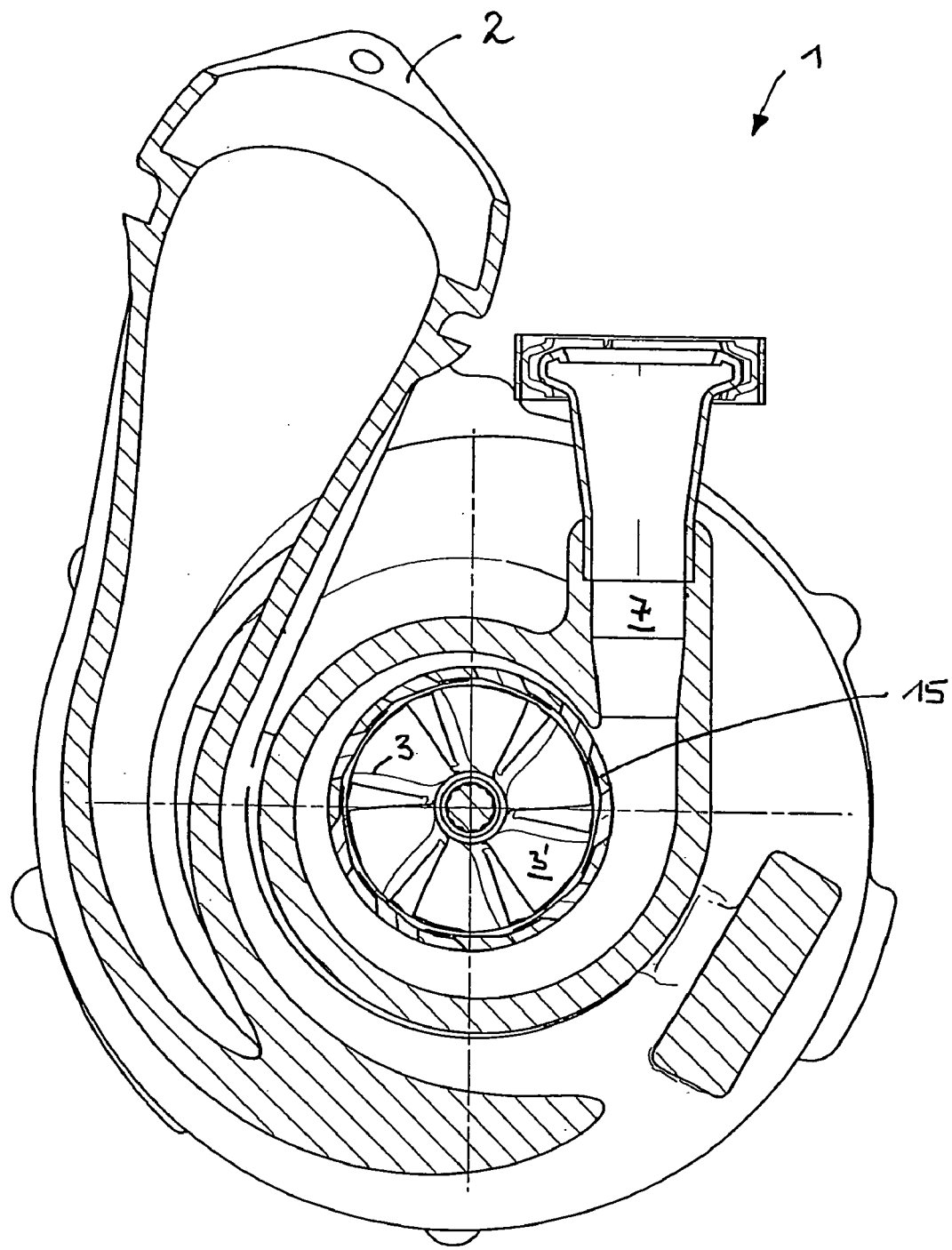
FIG. 2 shows a section through a compressor space of an exhaust turbocharger according to an embodiment of the present invention.

FIG. 2 shows a section through the compressor space 3'. The same reference numbers apply to the same components in FIGS. 1 and 2.

The compressor 3 is arranged so it can rotate in the compressor space 3'. As shown in FIG. 1, the exhaust recirculation line 7 develops approximately radially into the housing 2 and then extends in a spiral form in the housing 2 into the compressor space 3', as shown in FIG. 2. The mouth end of the exhaust recirculation line 7 runs mostly tangentially into the compressor space 3'. Furthermore, a flow guidance element 15 is arranged coaxially with the compressor 3, further increasing the spiral created by the spiral exhaust recirculation line 7.

The functioning of the exhaust turbocharger 1 is explained below.

Following the low-pressure exhaust recirculation, it is possible or necessary to implement exhaust recirculation rates of up to 70% in partial load operation because of the required reduction in NOx. The inventive design using the spiral channel of the exhaust recirculation line 7 in combination with the flow guidance element 15, a so-called pre-spiral bushing, directly upstream from the compressor 3 also permits introduction of the recycled exhaust stream upstream from the compressor 3 without a pre-spiral in addition to permitting a compact design.

Due to the oncoming flow with a pre-spiral effect leading to the compressor 3, the turbocharger rotational speed is increased during operation with a high exhaust recirculation rate. Since the exhaust recirculation takes place mainly in the partial load range, the required turbocharger rotational speed is reached more rapidly when there is an acceleration out of the partial load range into the full load range and therefore the torque is available more rapidly and there is an increase in dynamics.

The pre-twist is generated by means of a spiral channel in the housing 2 and flow guide elements 15, also resulting in the fact that no upstream flow guidance apparatus (flow resistance) is needed; this is accommodated in the main intake channel upstream from the compressor 3. Furthermore, there are no moving parts in the intake channel of the exhaust turbocharger 1, thereby greatly reducing the risk of damage to the compressor 3.

The spiral introduction of the exhaust recirculation stream into the main intake stream also permits a targeted pre-twist generation in the outer boundary zones of the intake stream in the compressor space 3'. Due to the high peripheral speeds on the outer edges of the compressor, this results in a maximally efficient generation of a pre-twist to increase the turbocharger rotational speed in the partial load range. In addition, due to the introduction of the exhaust stream distributed over the entire circumference, this permits optimum mixing of exhaust and clean air.

The inventive design improves the dynamics by providing higher turbocharger rotational speeds in the partial load range because of the production of a pre-twist by the exhaust recirculation stream. Furthermore, the inventive embodiment improves the overall efficiency in the partial load range, in particular at high exhaust recirculation rates. Furthermore, a compact design implementing the introduction of exhaust recirculation into the clean airstream is made possible by integration into the housing 2.

Figure 3A:
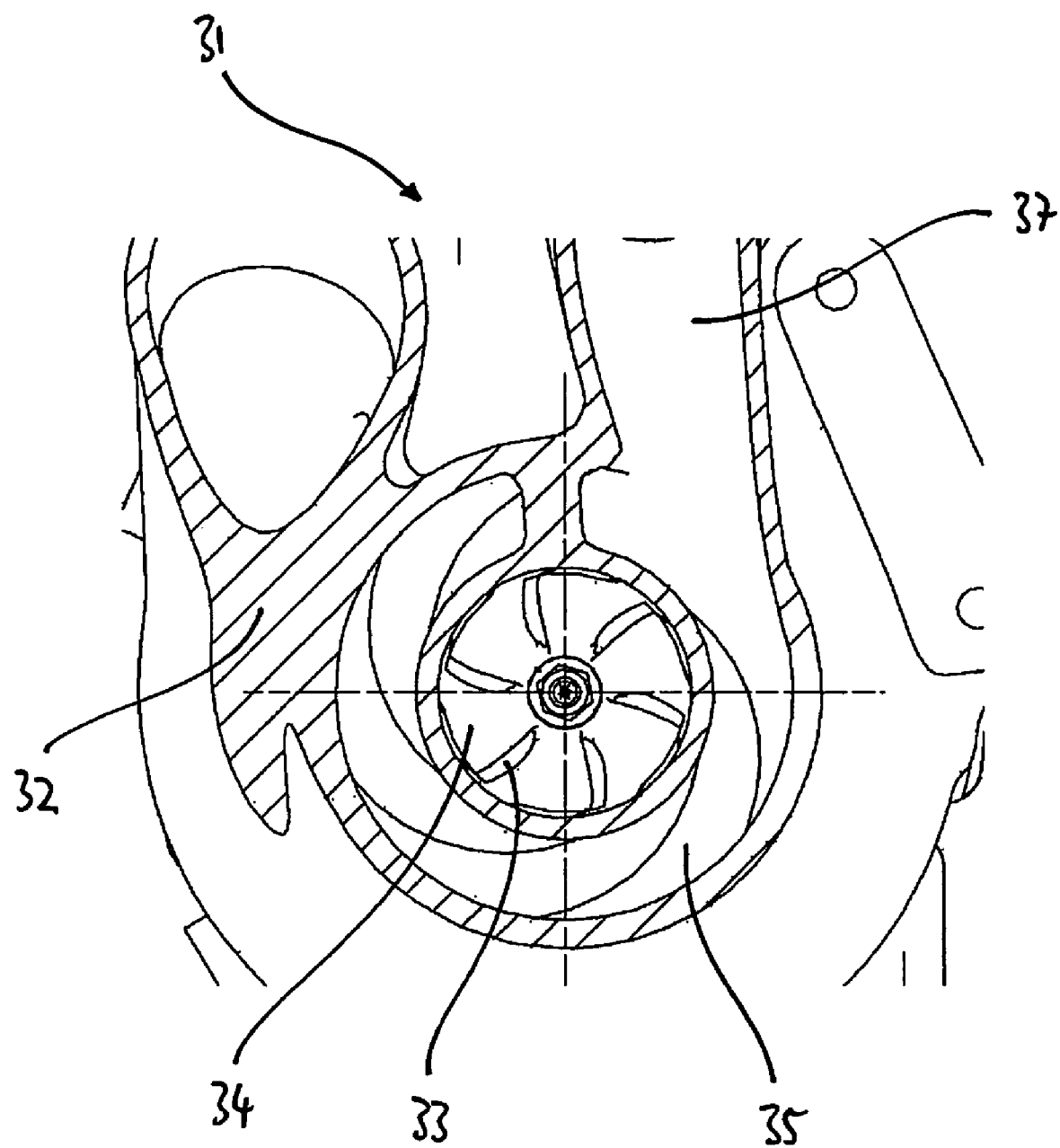
FIG. 3a shows a section through a compressor space of an exhaust gas turbocharger according to another embodiment of the present invention.
Figure 3B:
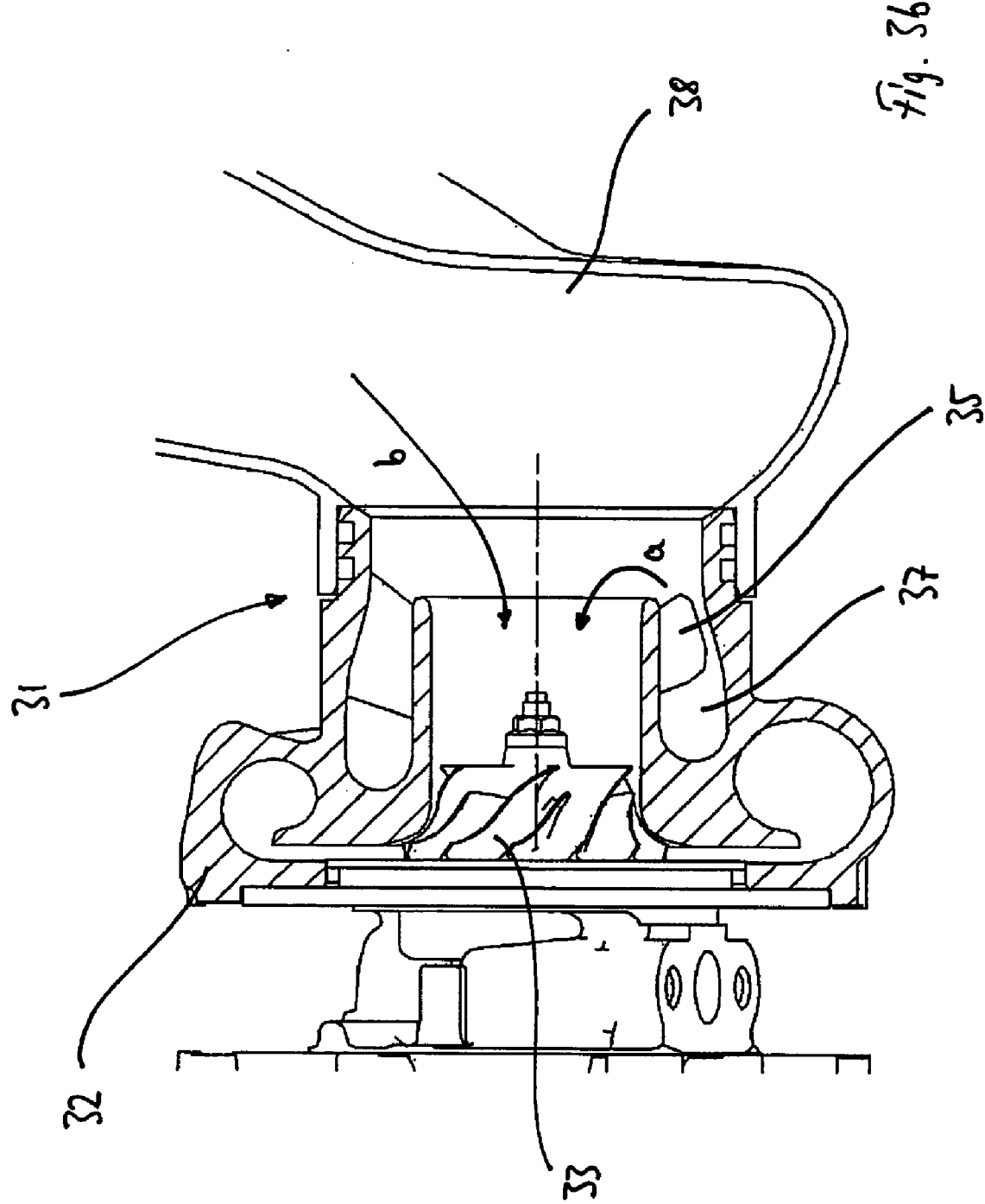

FIG. 3a shows a section through a compressor space 34 of another embodiment of an exhaust gas turbocharger 31 designed according to this invention; FIG. 3b shows a longitudinal section of the turbocharger 31.

The compressor space 34 is designed in a compressor housing 32, with a compressor wheel 33 arranged so it can rotate in the compressor space. An introduction space is shown as 37; for example, blow-by gases of the crankcase or returned exhaust gas can be introduced into this space or a compressor bypass may be connected to it.

Reference is made to the description of FIGS. 1 and 2 with regard to the functioning of the exhaust gas turbocharger 31 in particular. The exhaust gas turbocharger 31 in combination with the exhaust return line 37 also has a baffle 35. If necessary, however, the baffle 35 may also be omitted.

In comparison with the embodiment described above, the direction of discharge of the exhaust return line 37 into the compressor space 34 includes not only a radial component but also an axial component, where the amount of the axial component may vary from 0 to 100%. As FIG. 3b shows, the volume thus introduced flows from the introduction space 37 according to the direction of arrow a, and the flow coming from the clear air pipe 38 flows to the compressor wheel 33 according to the direction of arrow b.

The introduction point leads into the large-volume main stream b flowing out of the clean air pipe 38, so that the main stream b is only minimally constricted and the intake vacuum is reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NOTATION 1 exhaust turbocharger
2 housing
3 compressor
3' compressor space
4 exhaust turbine
4' turbine space
5 exhaust line
6 internal combustion engine
6' cylinder
7 low-pressure exhaust recirculation line
8 first heat exchanger
9 catalytic converter
10 second heat exchanger
11 intake tract
12 collector
13 high-pressure exhaust recirculation line
14 quantity-adjusting element
15 flow guidance element

What is claimed is:

1. An exhaust turbocharger, comprising:
   an exhaust turbine arranged within a turbine space of a turbocharger housing;
   a compressor arranged within a compressor space of the turbocharger housing; and
   an exhaust recirculation line arranged between an outlet from the turbine space to an inlet of the compressor space,
   wherein the exhaust recirculation line is formed at least in part on the turbocharger housing adjacent to the compressor space inlet in a spiral shape.

2. The exhaust turbocharger of claim 1, wherein the spiral portion of the exhaust recirculation line is arranged to introduce recirculated exhaust substantially tangentially into the compressor space inlet.

3. The exhaust turbocharger of claim 2, further comprising a flow guidance element arranged coaxially with the compressor,
wherein the flow guidance element is located immediately adjacent to the compressor and arranged to guide exhaust flowing through the exhaust recirculation line.

4. The exhaust turbocharger of claim 1, wherein the spiral portion of the exhaust recirculation line is arranged to introduce recirculated exhaust into the compressor space inlet with exhaust flow having an axial component.

5. The exhaust turbocharger of claim 4, further comprising a flow guidance element arranged coaxially with the compressor,
wherein the flow guidance element is located immediately adjacent to the compressor and arranged to guide exhaust flowing through the exhaust recirculation line.

6. The exhaust turbocharger of claim 1, further comprising a flow guidance element arranged coaxially with the compressor,
wherein the flow guidance element is located immediately adjacent to the compressor and arranged to guide exhaust flowing through the exhaust recirculation line.

* * * * *